United States Patent [19]

Mathews

[11] Patent Number: 4,694,551
[45] Date of Patent: Sep. 22, 1987

[54] METHOD OF REMANUFACTURING A ROCK DRILL BIT

[75] Inventor: Will W. Mathews, Germantown, Tenn.

[73] Assignee: Cummins Engine Company, Inc., Columbus, Ind.

[21] Appl. No.: 814,330

[22] Filed: Dec. 30, 1985

[51] Int. Cl.⁴ .............................................. B23P 6/00
[52] U.S. Cl. .............................. 29/402.08; 76/108 A; 29/402.13; 29/402.16
[58] Field of Search ......................... 76/108 R, 108 A; 29/402.01, 402.03, 402.04, 402.08, 402.09, 402.13, 402.16

[56] References Cited

U.S. PATENT DOCUMENTS

| | | | |
|---|---|---|---|
| 2,057,209 | 10/1936 | Schlumpf | 76/108 R |
| 3,850,256 | 11/1974 | McQueen | 76/108 A |
| 4,127,043 | 11/1978 | Evans | 76/108 |
| 4,158,973 | 6/1979 | Schumacher et al. | 76/108 A |
| 4,187,743 | 2/1980 | Thomas | 76/108 A |
| 4,249,621 | 2/1981 | Espana | 175/227 |
| 4,258,807 | 3/1981 | Fischer et al. | 175/375 |
| 4,266,622 | 5/1981 | Vezirian | 175/366 |
| 4,333,364 | 6/1982 | Varel | 76/108 A |
| 4,350,060 | 9/1982 | Vezirian | 76/108 A |
| 4,414,734 | 11/1983 | Atkinson | 29/464 |

OTHER PUBLICATIONS

Hughes Tool Division, Tri-Cone, Bit Handbook.

*Primary Examiner*—Roscoe V. Parker
*Attorney, Agent, or Firm*—Sixbey, Friedman & Leedom

[57] ABSTRACT

Methods for the remanufacture and reconditioning of rock drill bits of the type which include rolling cone cutters are provided. One method includes the steps of separating the bit leg extensions, journals and cone cutters from the bit body along a line perpendicular to the center of rotation of the bit body, salvaging usable cutter teeth, forming new leg, journal and cone assemblies and attaching the new assemblies to the salvaged bit body, which has been suitably machined to accept the new assemblies. An alternate method includes removing separately each leg, journal and cone cutter from the bit body in a manner which forms a curved saddle bore in the bit body, forming a new leg, journal and cone assembly including a mating surface corresponding to the configuration of the saddle bore and attaching each new assembly to the bit body at a saddle bore. A method of original manufacture for a rock drill bit is also disclosed wherein a one piece, unitary bit body is formed and the desired number of leg, journal and cone assemblies attached to the bit body according to one of the methods employed in the reconditioning process.

15 Claims, 7 Drawing Figures

METHOD OF REMANUFACTURING A ROCK DRILL BIT

DESCRIPTION

1. Technical Field

The present invention relates generally to methods for manufacturing drill bits of the type used in the petroleum industry and, in particular, to a method of whereby a rock drill bit can be either reconditioned for reuse or originally manufactured.

2. Background Art

Rock drill bits with rolling cone type cutters have enjoyed widespread use in the petroleum industry for over seventy years. Although many improvements have been made in rock drill bits since their introduction to prolong drill bit life, rock drill bits remain today a "throw-away" item. Once a drill bit no longer functions effectively, it must be removed from the well drill string and replaced with a new drill bit. The entire drill bit is then discarded, although a large portion of it is generally still in good condition. The rolling cone cutters and those portions of the drill bit body which support the cutters and are constantly in contact with the rock formations being drilled are typically the only drill bit parts which are worn. However, since there is currently no practical method for rebuilding a worn rock drill bit, the entire drill bit, which can cost the drill operator at least $3,000 and $4,000, must be discarded.

Considerable effort has been directed toward improving various features of the rolling cone cutter type of rock drill bit as well as toward methods of originally manufacturing such drill bits. There is no prior art, however, directed to methods for rebuilding or reconditioning worn rock drill bits so that only the worn out portions need to be discarded and those drill bit portions which are still usable can be reused.

A reconditioned or remanufactured rock drill bit which is not as strong as an originally manufactured bit could present problems for the drill operator which could ultimately negate any cost savings that might be achieved by the reconditioning process. If, for example, a failure of the reconditioned rock drill bit requires that drilling be stopped to pull the inoperative drill bit up from the bottom of the well so that it can be replaced, the expense associated with the interruption of drilling operations is likely to exceed any savings achieved by employing a reconditioned bit. Consequently, any method of reconditioning or remanufacturing a rock drill bit must produce a bit which is as reliable as an originally manufactured bit. The bit body must be free from weak areas which could cause the bit body to crack or break when subjected to stresses during the drilling process. In addition, a successful remanufacturing process must produce a rock drill bit with cone cutters which are accurately aligned to avoid premature and uneven wear of the bit teeth.

Prior art methods of originally manufacturing rock drill bits are not readily adaptable to the reconditioning or remanufacturing of the bits. These methods are not directed toward salvaging a substantial portion of the drill bit body and building the additional components to fit on the salvaged body to produce an integral whole. The method of manufacture of a rock bit disclosed in U.S. Pat. No. 4,187,743 to Thomas illustrates the problems encountered in attempting to apply known original equipment manufacturing methods to reconditioning. The method described in this patent includes the welding together of three separate rock bit leg assemblies, each of which includes a cutter cone which has been preassembled to its supporting structure on the leg assembly. A used rock drill bit would have to be cut along its vertical axis into three sections before these methods could be used, thereby unnecessarily creating surfaces to be rejoined which could weaken the integrity of the bit body.

Similar techniques of rock drill bit assembly are described in U.S. Pat. Nos. 4,127,043; 4,249,621; 4,258,807 and 4,414,734. The method of manufacture disclosed in each of these patents is premised essentially on forming a segment including part of the bit body and cutting cone support structure and then assembling two or three such segments into a complete bit. While such a method can be employed with good results in the original manufacture of a rock bit, it is a costly and potentially ineffective reconditioning procedure. As discussed above, the introduction of multiple joints in a previously manufactured structure could create weakened areas which could cause breakage of the bit body when the bit is subjected to the stresses of drilling. Consequently, the prior art methods of rock bit manufacture which relate to the assembly of multi-segment bits, although well suited to original equipment manufacture where each segment can be formed to proper tolerances and assembled securely to form a strong, unitary structure, cannot be effectively employed in bit remanufacture.

A method of making a non-segmented, one piece rock bit body is disclosed in U.S. Pat. Nos. 4,266,622 and 4,350,060 to Vezirian. The one piece rock bit body described in these patents includes at least two integral leg portions which extend beyond the bit body. Cone cutter subassemblies must be positioned within each of the legs in their operative positions and then secured to the legs. However, while the rock drill bit is in use, the outer surfaces of the leg portions of the bit body are in almost constant contact with the rock formation being drilled. Therefore, these surfaces can experience significant wear and generally should not be reused. Moreover, the removal of the worn cone cutter subassemblies from the legs of one of these bit bodies to permit the substitution of new ones can be a difficult, time-consuming procedure.

The prior art, consequently, has failed to disclose a method whereby a used, worn rock drill bit can be economically and effectively reconditioned or remanufactured to produce a reusable bit capable of functioning reliably during drilling operations.

SUMMARY OF THE INVENTION

It is, therefore, a primary object of the present invention to provide a method for remanufacturing or reconditioning a used rock drill bit to produce a bit which will function as reliably as an originally manufactured bit.

It is another object of the present invention to provide a method for remanufacturing or reconditioning a used rock drill bit which salvages a maximum amount of the unworn, reusable portion of the bit and requires the replacement of a minimum amount of the used bit.

It is a further object of the present invention to provide a method for remanufacturing or reconditioning a used rock drill bit which is economical and produces a supply of reusable bits at a significant cost savings over the cost of obtaining originally manufactured bits.

It is yet another object of the present invention to provide a method for remanufacturing or reconditioning a used rock drill bit which results in very accurate alignment of the cutter cone.

It is a still further object of the present invention to provide a method for remanufacturing or reconditioning a used rock drill bit which includes the removal and the replacement of the bit legs, journals and cone cutters.

In accordance with the present invention, a method for remanufacturing and reconditioning a rock drill bit is provided including the steps of separating the legs, journals and cone cutters from the bit body to expose the bit body surface, removing unworn, reusable carbide teeth from the separated cone cutters, facing the exposed bit body surface, forming a new leg, journal and cone cutter assembly to replace each leg, journal and cone cutter separated from the bit body; and securely attaching the new leg, journal and cone cutter assemblies to the faced bit body surface so that the cone cutter assemblies are accurately aligned with each other.

The present invention further provides a method for originally manufacturing a rock drill bit which includes the steps of forming a unitary bit body from a single piece of material, forming at least two leg assemblies, each of which includes a bit body leg extension, a journal and a cone cutter, securing the leg assemblies to the bit body and aligning the cone cutter assemblies to a desired orientation.

Other objects and advantages of the present invention will be apparently from a review of the following description, claims and drawings.

BEST MODE FOR CARRYING OUT THE INVENTION

Roller cutter rock drill bits of the type to which the present invention pertains have three major components: the cutters, the bearings which rotatably support the cutters and the bit body. The cutters or cutting elements are typically formed on cone-shaped supports and include circumferential rows of teeth which are positioned to interfit between the rows of teeth on adjacent cones. Although various bearing structures may be employed to rotatably support the cutters, journal-type bearings are widely used. The bit body includes a threaded connection for attaching the bit body to the drill stem, lubricant reservoirs and conduits for the flow of drilling fluid. In addition to supporting the cutting elements, the bit body directs drilling fluid to the bottom of the hole and to the cutters to keep the area being drilled and the cutters clean.

During drilling operations a rock bit is subjected to severe usage, particularly if the drilling is being conducted in a hard rock formation. The stresses created on the bit tend to chip, break or losen the cutting teeth and wear or break the cones. In addition, the bearing surfaces, such as the journals which rotatably support the cones, are subject to wear. Bit manufacturers typically recommend weights and rotary speeds for each type of drill bit which minimize bit wear. If these operating parameters are not followed, wear of the bit components may be accelerated. In addition, factors such as encountering an unexpectedly hard rock formation, an obstruction in the hole or improperly functioning hydraulics can also accelerate bit wear or even cause bit failure. The only available response to rock drill bit wear or failure until the present invention has been to discard the worn or broken bit and install a brand new one on the drill stem, even though only the cutting teeth or perhaps one of the cones was worn. The present invention provides a method for salvaging usable bit components and reconditioning them in a manner which makes available to the drill operator a reliable drill bit at a significant cost savings over originally manufactured drill bits.

Figure 1:
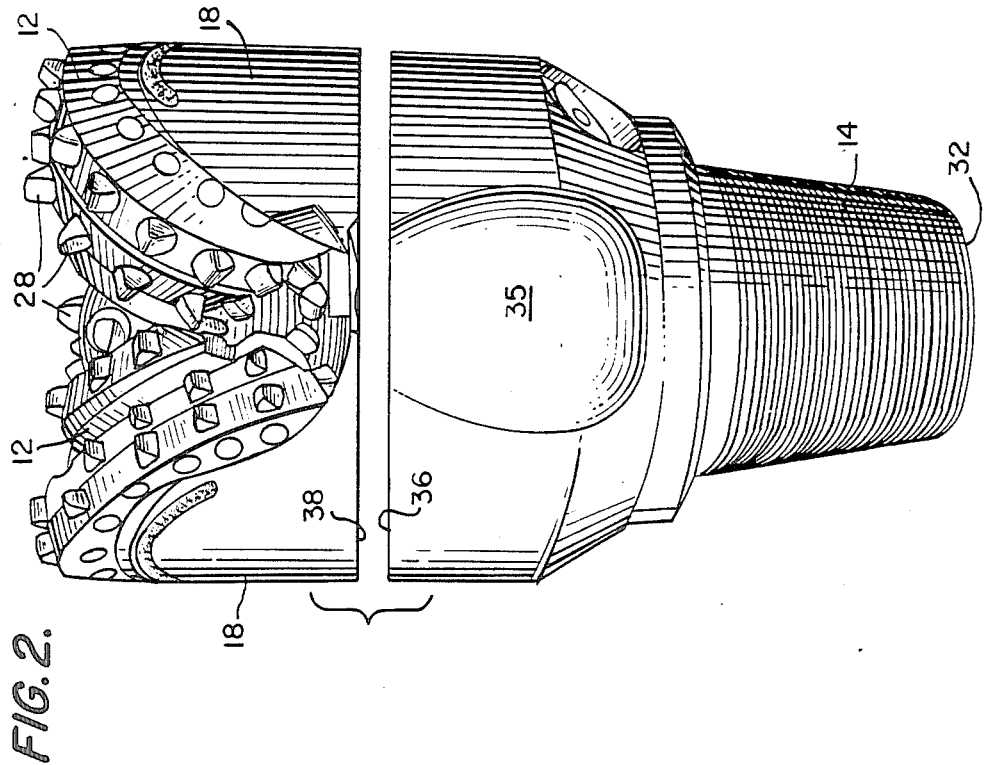
FIG. 1 is a broken side perspective view of a rock drill bit.

Referring to the drawings, FIG. 1 illustrates, in broken side perspective view, a rock drill bit 10 which can be remanufacturd according to the present invention. Although the rock drill bit illustrated and discussed herein has three cones 12, the method of the present invention is applicable to a drill bit having two cones. A threaded drill stem connector 14, which is located at the opposite end of the bit from the cones 12, is shown in the drawings as if it was positioned at the bottom of the drill bit. In operation, however, the cutting cones 12 would be located below the threaded connector 14 so that the lowermost portion of the assembled drill bit would be cones. The threaded connector 14 is engaged by a correspondingly threaded drill string or stem (not shown) which extends upwardly from the bottom of the bore hole being drilled by the bit 10 to the earth's surface.

The threaded connector 14 is part of the bit body 16, which supports three substantially identical leg extensions 18, which, in turn, support the three cones 12. The bit body 16 is caused to rotate about a central axis by the drill stem during drilling operations. Each leg extension 18 includes an outer shirttail portion 20 which may be employed to form the external annular gage surface of the bit. The shirttail portion 20 additionally includes journal mounting structure (not shown) which attaches a journal 22 to the bit leg extension. Each cone 12 is rotatably mounted on a journal 22, such as is shown in crosssection in FIG. 1.

A lubrication supply source 24 for providing lubricant to the journal bearing surfaces is contained within the bit body 16 as shown in FIG. 1. A passage 26 formed in each leg extension 18 provides fluid communication between the lubrication supply source 24 and the journal bearing surfaces to assure proper lubrication of these bearing surfaces during drilling operations.

Each cone 12, which is rotatably mounted on a journal 22, includes cutting teeth 28 which are arranged on the outer surface of each cone in circumferential rows so that the surface of the cone may contain several rows of teeth. The rows of teeth of adjacent cones must be spaced so that optimum intermeshing and interaction of the teeth can occur as the cones rotate on their journals during drilling. The pattern and location of the teeth 28 is unique for each cone so that these cutting structures will disintegrate the rock formation as the bit is rotated within the hole. The material from which the cutting teeth 28 are formed will directly affect the useful life of the rock drill bit 10. If a single tooth breaks or becomes very worn, the remaining teeth will be overloaded and wear more quickly. Therefore, it is preferred to employ teeth formed either from sintered tungsten carbide alone or tungsten carbide combined with other alloys. These tungsten carbide teeth are very expensive; however, until the present invention, they were discarded with the rest of the worn-out bit, even though many of them were not worn.

The bit body 16 further includes a central channel 30 coextensive with the axis of rotation and the central longitudinal axis of the drill bit which communicates at one end through a port 32 with the drill stem (not shown) and which may terminate at the opposite end in a plurality of jet nozzles 34, only one of which is shown in FIG. 1. Drilling fluid can then enter the bit body from the drill stem (not shown) through port 32 and pass downwardly through channel 30 to be discharged through nozzle 34. Nozzle housing 35 may be formed integrally with the bit body.

The cessation of drilling operations to replace a worn and, thus, inoperative drill bit, as previously mentioned, is usually a costly procedure. The present invention can effectively reduce that cost by providing a reconditioned drill bit which functions as reliably as an originally manufactured drill bit. In addition, the remanufacturing process described herein can be adapted to be used to originally manufacture new drill bits at a lower cost than is possible with other manufacturing methods.

Figure 2:
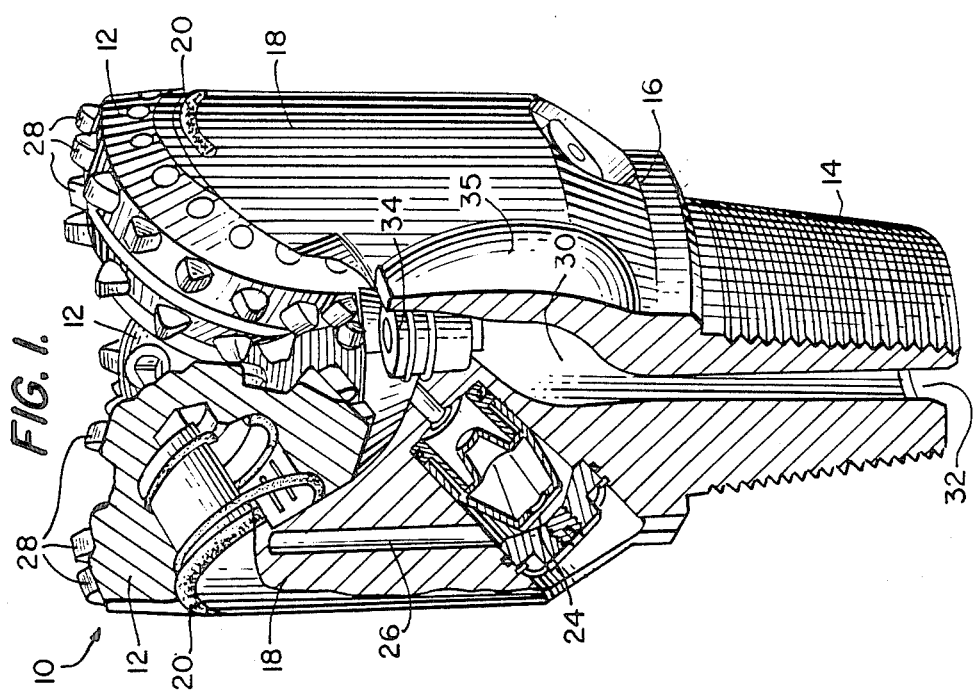
FIG. 2 is a side perspective view of a rock drill bit showing the separation of the legs, journals and cone cutters according to one embodiment of the present invention.

FIG. 2 illustrates one reconditioning method in accordance with the present invention. Each drill bit to be reconditioned must be examined carefully to determine the extent of the wear or any other damage caused by the stresses of drilling. The present method should not be employed on a bit body which is worn or damaged or the resulting reconditioned bit will not be capable of reliable performance. Once it has been ascertained that the bit body can be effectively salvaged, the leg extensions 18 including the journals (not shown) and the cones 12 are separated from the bit body 16 along a plane perpendicular to the central axis of the bit body located at approximately the level of the nozzles 34. Separation of the leg assemblies from the bit body can be accomplished in a variety of ways. However, is it preferred to sever the bit body from the leg extensions with a horizontal band saw. Those tungsten carbide teeth 28 which are salvagable and can be reused are then removed from each cone 12, and the leg assemblies are then discarded.

After the leg extensions, journals and cones are separated from the bit body, the bit body is left with a substantially flat surface 36 and has the configuration shown in FIG. 2 between surface 36 and port 32. Surface 36 may be faced on a lathe to prepare the bit body for reconditioning. The bit body surface 36 must be prepared, by machining, milling or in some similar suitable way, to receive new leg extension and journal assemblies. Any redrilling of the lubricant supply passages, central channel or nozzle housing which is required may be done at this point. Either two or three new leg and journal assemblies will be required to complete the reconditioning, depending upon whether the bit has two or three cone cutters. Leg and journal assemblies which will fit on the reconditioned bit body are relatively easily constructed by conventional methods. It is preferred to form these structures by hot forging. However, they may be cast in one of several ways known to the art. The bit body engaging surface 38 of each leg extenstion 18 must be substantially flat and may require facing by machining, milling or the like to correspond to surface 36 on the bit body 16. The interface between surface 36 and surface 38 should preferably be no more than 0.003 to 0.005 inches apart during the attachment procedure to achieve optimum attachment of the bit body and leg extensions. In addition, the leg extensions and journals will need to be positioned on the bit body and aligned so that the cones are in correct alignment and intermesh properly. Since the parts to be aligned are small, the alignment can be accomplished in large part by the machining of the parts.

Mating surfaces 36 on the bit body and 38 on the leg extensions are secured by electron beam welding techniques. A focused beam of electrons is applied to irradiate surfaces 36 and 38 and melt them to form a welded interface which can extend deeply between the bit body and the leg extensions in the direction of beam penetration. Since electron beam welds are characterized by a depth of penetration which is much larger than the width of the heat affected zone, warping and distortion of the welded parts is minimized. Consequently, alignment of parts joined by electron beam welding is easier to achieve. As discussed above, any gap between surfaces 36 and 38 should be less than about 0.004 inches for best welding results.

New cones into which salvaged, reusable tungsten carbide teeth have been inserted are then mounted on the journals and aligned to complete the bit remanufacture process. The reconditioned rock drill bit thus produced provides a lower cost, reliable alternative to the installation of a completely new bit.

Figure 4:
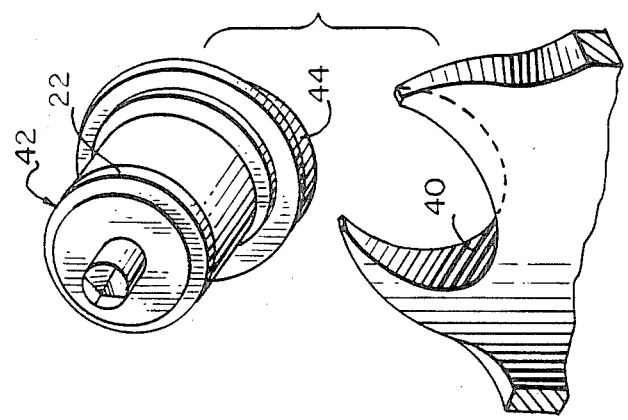
FIG. 4 is an exploded perspective of a portion of a rock drill bit viewed from the inside of the bit body wherein the used leg portion has been separated from the bit body according to the method of FIG. 3 and a new leg and journal assembly is positioned above the bit body.
Figure 5:
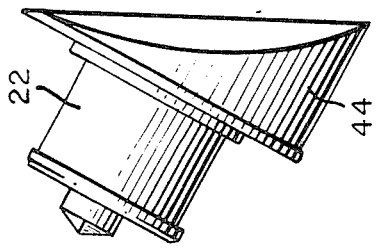
FIG. 5 is a side view of a leg extension and journal assembly.
Figure 3:
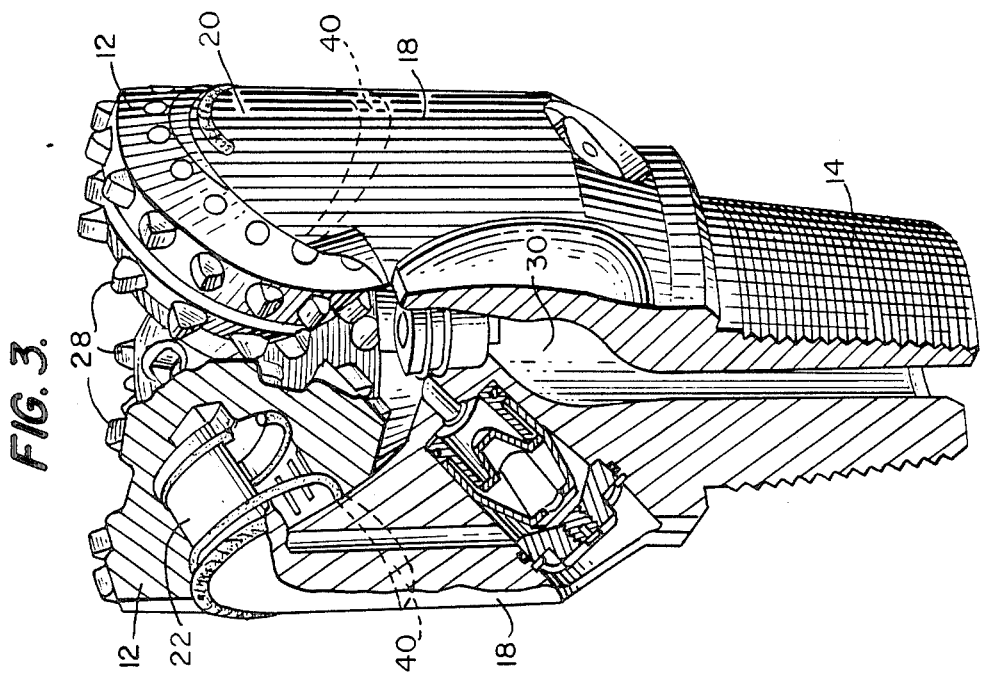
FIG. 3 is a side perspective view of a rock drill bit showing an alternate method of separating the leg, journal and cutter portion from the bit body.

FIGS. 3, 4 and 5 illustrate another method of reconditioning a rock drill bit according to the present invention. In this embodiment a hollow milling tool is preferably used to cut the leg assemblies from the worn drill bit. A curved saddle bore 40 is formed below each leg extension to be substantially coaxial with the center of rotation of each cone. The axis of rotation of the saddle bore 40 will be approximately transverse to the axis of rotation of the bit body 16. In FIG. 3, two such saddle bores 40 are shown in dashed outline. All of the leg extensions and cones would be cut away to form saddle bores as part of the remanufacturing process. The saddle bores 40 are cut so that the attachment of a new leg extension and journal assembly 42, as shown without a cone 12 in FIG. 4, will accurately locate the cone cutters at the correct angle and skew.

FIG. 4 illustrates, in exploded perspective, the position of leg and journal assembly 42 without a cone prior to attachment to the bit body 16 as the assembly appears viewed from the interior of the bit body from central channel 30. The assembly 42 is formed with a saddle engaging surface 44 having a radius of curvature subtantialy equal to that of the saddle bore 40. The formation of the leg and journal assembly 42 can be accomplished on turning equipment with a drilling operation, which is a relatively simple, low cost procedure. The saddle engaging surface 44 of the leg and journal assembly 42 can be attached to the saddle bore 40 by electron beam welding techniques as discussed above. Because the saddle bores are formed to position the cutters accurately, only minimal manual alignment of the parts is required, and the leg and journal assembly complete with a cone and cutters can be attached to the bit body in a fully assembled condition.

FIG. 5 illustrates, in side view, a leg and journal assembly 42, illustrating the relationship between journal 22, shirttail port 20, leg extension 18 and saddle engaging surface 44.

Although the remanufacturing method of this invention has been described and shown with respect to separating the leg extensions and related structures either along a plane perpendicular to the bit axis of rotation or by the generation of saddle bores, other methods of removing the leg extensions which generate surfaces of other geometries may also be employed. For example, the leg extensions may be separated from the bit body by generating a concave or convex conical surface, in which the central axis of the cone is coaxial with the axis of rotation of the bit. In addition, surfaces of other configurations and geometries, such as concave or convex spherical surfaces, could be generated. However, the generation of a surface having any configuration during the separation of the leg extension from the bit body is contemplated to fall within the scope of the present invention.

The method of remanufacturing a rock drill bit discussed in connection with FIGS. 3, 4 and 5 can also be applied to the original manufacture of new rock drill bits. The bit body 16, which is formed from a single, integral piece of material can be produced by casting or forging. The bit body thus produced would be drilled and/or machined as required to form the lubrication passages 26, drilling fluid channel 30, nozzle housing 35, threaded connector 14 and saddle bores 40. Leg and journal assemblies 43 would then be turned and drilled, the cones 12 with teeth 28 formed and secured to assembly 42, and the complete leg, journal and cone assembly attached to a saddle bore 40 by electron beam welding. An originally manufactured rock drill bit produced as just described costs significantly less to manufacture than the bits of the prior art.

Figure 6:
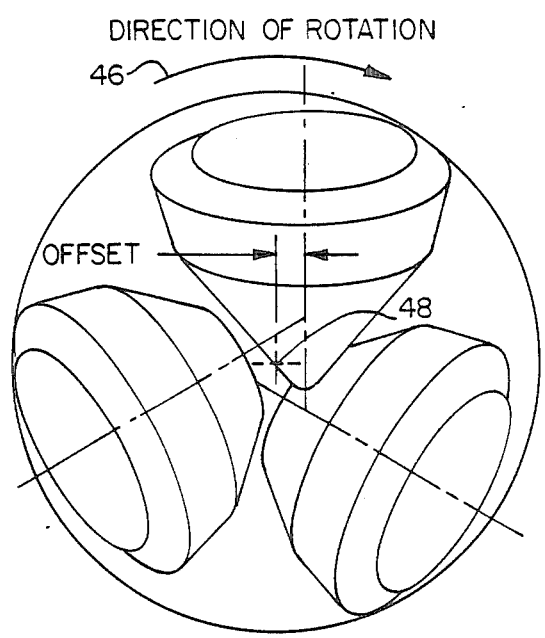
FIG. 6 is a diagrammatic representation of proper cutter cone alignment.
Figure 7:
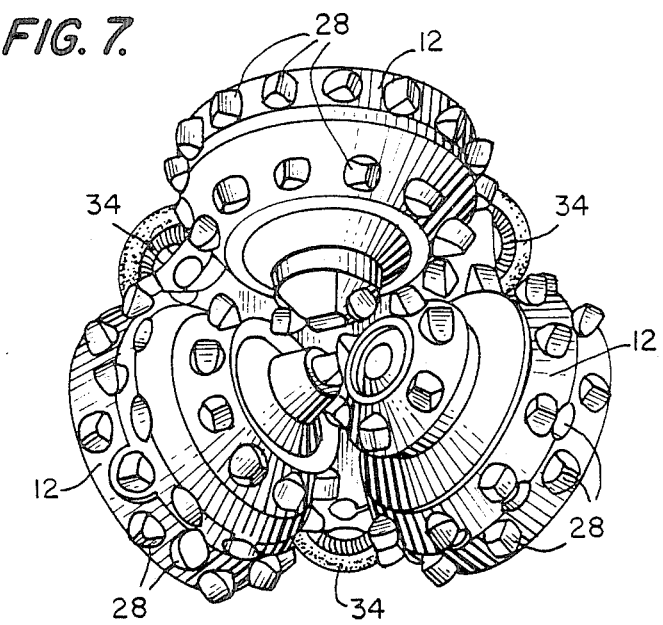
FIG. 7 illustrates, in top view, the bit cutter cones shown diagrammatically in FIG. 5.

Moreover, use of the saddle bore formation technique both to remanufacture and to originally manufacture a rock drill bit greatly simplifies cone and cutter alignment, thus substantially eliminating drill bit wear problems caused by nonaligned cones. FIGS. 6 and 7 illustrate one type of cone alignment. In FIG. 6 the position of the cones relative to each other is shown diagrammatically. The direction of rotation of the bit is indicated by the arrow 46, and the center of bit rotation is shown at point 48. The cones in FIGS. 6 and 7 have two or more basic cone angles, none of which has its apex at point 48. However, since the cones are forced to rotate about the bit centerline 48, they slip as they rotate and produce a tearing, gouging action. Cone action can be increased by offsetting the cone centerlines from point 48, as shown in FIG. 6. FIG. 7 illustrates three cones in the positions shown diagrammatically in FIG. 6, and demonstrates the intermeshing of the cutting teeth 28. If proper cone alignment is not achieved, whether it is the offset type of alignment just discussed or a more centered alignment, breakage or other damage to the cutting teeth could occur and lead to premature bit failure. Consequently, it is critical to achieve proper cone alignment while performing the bit remanufacturing and manufacturing processes of the present invention.

The present remanufacturing process has been discussed with respect to its application to tungsten carbide cutters. The principles described herein may also be applied to recondition other cutters, such as those made of milled steel and having abrasion resistant hard facings. In addition, while the specific journal structure of the remanufactured bit has not been described, it will be apparent to those skilled in the art that the present methods are well suited for reconditioning drill bits having any of the commonly used journal structures. These methods will be equally successful when applied to journals having ball bearings, to journals having annular thrust members and to journals of any other construction. Many other modifications and variations of the present methods within the purview of the following claims will be apparent to those skilled in this art.

INDUSTRIAL APPLICABILITY

The reconditioning and remanufacturing methods will find their primary application in the salvage and reconstruction of rolling cone cutter rock drill bits of the kind employed by the petroleum industry to dig bore holes intended to lead to petroleum deposits. However, any drill bit of similar construction, whatever its end use, can be effectively and inexpensively reconditioned to provide a reliable alternative to discarding a worn bit and replacing it with a completely new one. In addition, the methods described herein can be employed in the original manufacture of a rock drill bit at a lower cost than is currently possible with available original equipment manufacturing methods.

I claim:

1. A method for remanufacturing a used rotary rock drill bit having a bit body with leg extensions supporting journals on which are rotatably mounted at least two cones including cutting elements, including the steps of:
   (a) separating all the leg extensions, journals and cones simultaneously from the bit body along a line perpendicular to the central axis of rotation of the drill bit to form a substantially planar bit body attachment surface and discarding said leg extensions, journals and cones;
   (b) forming at least two cone support assemblies, including leg extensions, journals and cones, from new materials;
   (c) attaching the cutting element-containing cone assemblies to the bit body to form a remanufactured drill bit;
   (d) removing the reusable cutting elements from the cones; and
   (e) attaching the reusable cutting elements recoverd in step (a) to the cones formed in step (b), adding new cutting elements as required to provide each cone with a full complement of cutting elements.

2. The method for remanufacturing a rock drill bit described in claim 1, further including the step of machining the bit body attachment surface.

3. The method for remanufacturing a rock drill bit described in claim 2, wherein the cone support assemblies formed from new material have formed thereon a bit body mating surface corresponding to the bit body attachment surface.

4. The method for remanufacturing a rock drill bit described in claim 3, wherein the cone assembly bit body mating surface and the bit body attachment surface are attached together by electron beam welding.

5. The method for remanufacturing a rock drill bit described in claim 1, wherein the bit includes three cones mounted thereon.

6. The method for remanufacturing a rock drill bit described in claim 1, further including the step of aligning the axis of the cones relative to the central axis of rotation of the bit body.

7. The method for remanufacturing a rock drill bit described in claim 1, wherein the cone assemblies are attached to the bit body attachment surface by electron beam welding.

8. A method for remanufacturing a used rotary rock drill bit having a bit body with leg extensions supporting journals on which are rotatably mounted at least two cones including cutting elements, including the steps of:
 (a) forming a plurality of saddle bores to separate said leg extensions, journals and cones from the bit body to form a plurality of bit body attachment surfaces, each surface being substantially coaxial with the axis of rotation of a cone, and discarding said leg extensions, journals and cones;
 (b) forming at least two cone support assemblies, including leg extensions, journals and cones, from new materials;
 (c) attaching the cutting element-containing cone assemblies to the bit body to form a remanufactured drill bit;
 (d) removing the reusable cutting elements from the cones; and
 (e) attaching the reusable cutting elements recovered in step (a) to the cones formed in step (b), adding new cutting elements as required to provide each cone with a full complement of cutting elements.

9. The method for remanufacturing a rock drill bit described in claim 8, further including the step of machining each of said plurality of coaxial bit body attachment surfaces.

10. The method for remanufacturing a rock drill bit described in claim 9, wherein said cone support assemblies formed from new material have formed thereon a curved bit body mating surface corresponding to a bit body attachment surface, the radius of curvature of each said mating surface corresponding to the radius of curvature of each said attachment surface.

11. The method for remanufacturing a rock drill bit described in claim 10, wherein the bore engaging surface of each cone assembly is fitted to a corresponding curved bore in the bit body and attached thereto by electron beam welding.

12. The method for remanufacturing a rock drill bit described in claim 11, wherein the orientation of each curved bore formed in the bit body causes the cones to be correctly aligned when the cone assemblies are attached to the bit body.

13. The method for remanufacturing a rock drill bit described in claim 10, wherein each cone assembly is attached to a curved bore by electron beam welding.

14. The method for remanufacturing a rock drill bit described in claim 10, wherein the orientation of each saddle bore formed in the bit body causes the cones to be correctly aligned when all the cone assemblies are attached to the bit body attachment surfaces.

15. The method for remanufacturing a rock drill bit described in claim 8, wherein the bit includes three cones mounted thereon.

* * * * *